United States Patent
Yoon (10) Patent No.: US 12,293,195 B2
(45) Date of Patent: May 6, 2025

(54) DATA STORAGE DEVICE AND OPERATING METHOD THEREOF

(71) Applicant: SK hynix Inc., Icheon-si (KR)

(72) Inventor: Ji Ho Yoon, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 294 days.

(21) Appl. No.: 17/720,727

(22) Filed: Apr. 14, 2022

(65) Prior Publication Data

US 2023/0087462 A1   Mar. 23, 2023

(30) Foreign Application Priority Data

Sep. 15, 2021   (KR) .......................... 10-2021-0123328

(51) Int. Cl.
*G06F 9/4401*   (2018.01)
*G06F 3/06*   (2006.01)

(52) U.S. Cl.
CPC .......... *G06F 9/4406* (2013.01); *G06F 3/0604* (2013.01); *G06F 3/0644* (2013.01); *G06F 3/0658* (2013.01); *G06F 3/0673* (2013.01)

(58) Field of Classification Search
CPC .... G06F 9/4406; G06F 3/0604; G06F 3/0644; G06F 3/0658; G06F 3/0673
See application file for complete search history.

(56) References Cited

U.S. PATENT DOCUMENTS

| | | | |
|---|---|---|---|
| 2014/0101426 A1* | 4/2014 | Senthurpandi | G06F 21/575 713/1 |
| 2015/0046749 A1* | 2/2015 | Kumagai | G06F 11/1417 714/15 |
| 2017/0116131 A1* | 4/2017 | Lin | G06F 12/10 |
| 2018/0107417 A1* | 4/2018 | Shechter | G06F 3/0619 |
| 2019/0303292 A1* | 10/2019 | Byun | G06F 12/0246 |
| 2019/0340058 A1* | 11/2019 | Sasidharan | G06F 11/079 |
| 2022/0357878 A1* | 11/2022 | Nayak | G06F 3/0604 |
| 2023/0072721 A1* | 3/2023 | Park | G06F 3/0679 |

FOREIGN PATENT DOCUMENTS

| | | |
|---|---|---|
| KR | 19990060779 A | 7/1999 |
| KR | 20050111063 A | 11/2005 |

* cited by examiner

*Primary Examiner* — Sangseok Park
(74) *Attorney, Agent, or Firm* — Perkins Coie LLP (57) ABSTRACT

Data storage devices and operating methods that can improve a booting operation are disclosed. A storage device includes: a memory device including one or more boot partitions configured to store boot data for executing an operating system; and a memory controller coupled to the memory device and configured to perform, upon receiving power, a rebuild operation to restore first system data including active boot partition information associated with an activated boot partition among the one or more boot partitions and provide the active boot partition information to a host. Upon receiving, by the memory controller, from the host, a boot partition read request based on the active boot partition information, the memory controller transmits, to the host, the boot data stored in a boot partition corresponding to the active boot partition information.

20 Claims, 9 Drawing Sheets

DATA STORAGE DEVICE AND OPERATING METHOD THEREOF

CROSS-REFERENCE TO RELATED APPLICATION

This patent document claims the priority and benefits of the Korean patent application number 10-2021-0123328, filed on Sep. 15, 2021, which is incorporated herein by reference in its entirety.

TECHNICAL FIELD

The disclosed technology generally relates to an electronic device, and more particularly, to a data storage device and an operating method thereof.

BACKGROUND

A data storage device is a device that is used by a host device such as a computer or a smart phone to store data. The data storage device may include a memory device for storing data and a memory controller for controlling the memory device. The memory device is classified into a volatile memory device and a nonvolatile memory device.

The volatile memory device only retains its data while the device is powered and loses its data when power is lost. Examples of the volatile memory device may include a Static Random Access Memory (SRAM) and a Dynamic Random Access Memory (DRAM).

The nonvolatile memory device retains stored data even in the absence of power supply and thus does not lose its data when power is lost. Examples of the nonvolatile memory device may include a Read Only Memory (ROM), a Programmable ROM (PROM), an Electrically Programmable ROM (EPROM), and an Electrically Erasable ROM (EEROM), a flash memory.

SUMMARY

The disclosed technology can be implemented in some embodiments to provide a data storage device that can improve a booting operation and an operating method of the data storage device.

In an aspect of the disclosed technology, there is provided a storage device including: a memory device including one or more boot partitions configured to store boot data for executing an operating system; and a memory controller coupled to the memory device and configured to perform, upon receiving power, a rebuild operation to restore first system data including an active boot partition information associated with an activated boot partition among the one or more boot partitions and provide the active boot partition information to a host, wherein, upon receiving, by the memory controller, from the host, a boot partition read request based on the active boot partition information, the memory controller transmits, to the host, the boot data stored in a boot partition corresponding to the active boot partition information.

In another aspect of the disclosed technology, there is provided a method of operating a storage device including one or more boot partitions configured to store boot data for executing an operating system, the method including: performing, upon receiving power, a rebuild operation to restore first system data including active boot partition information associated with an activated boot partition among the one or more boot partitions; transmitting the active boot partition information to a host, upon restoration of the first system data; and transmitting, to the host, the boot data stored in a boot partition corresponding to the active boot partition information in response to receiving, from the host, a boot partition read request based on the active boot partition information.

In another aspect of the disclosed technology, there is provided a system including: a memory device including one or more boot partitions configured to store boot data for executing an operating system; a memory controller coupled to the memory device and configured to perform, upon receiving power, a rebuild operation to restore first system data including active boot partition information associated with an activated boot partition among the one or more boot partitions; and a host in communication with the memory controller and configured to check the first system data from the memory controller, and transmit, to the memory controller, a boot partition read request based on the active boot partition information, wherein, upon receiving the boot partition read request at the memory controller, the memory controller transmits, to the host, the boot data stored in a boot partition corresponding to the active boot partition information.

In another aspect of the disclosed technology, there is provided a storage device including: a memory device including one or more boot partitions storing boot data for executing an operating system; and a memory controller configured to perform a rebuild operation of recovering first system data including an Active Boot Partition ID (ABPID) representing information on an activated boot partition among the boot partitions and provide the ABPID to a host, when power is supplied, wherein, when the memory controller receives a boot partition read request based on the ABPID from the host, the memory controller transmits, to the host, the boot data stored a boot partition corresponding to the ABPID.

In another aspect of the disclosed technology, there is provided a method of operating a storage device including one or more boot partitions storing boot data for executing an operating system, the method including: performing a rebuild operation of recovering first system data including an Active Boot Partition ID (ABPID) representing information on an activated boot partition among the boot partitions, when power is supplied; transmitting the ABPID to a host, when the first system data is recovered; and transmitting, to the host, the boot data stored in a boot partition corresponding to the ABPID, when a boot partition read request based on the ABPID is received from the host.

In another aspect of the disclosed technology, there is provided a system including: a memory device including one or more boot partitions storing boot data for executing an operating system; a memory controller configured to perform a rebuild operation of recovering first system data including an Active Boot Partition ID (ABPID) representing information on an activated boot partition among the boot partitions, when power is supplied; and a host configured to check the first system data from the memory controller, and transmit a boot partition read request based on the ABPID to the memory controller, wherein, when the memory controller receives the boot partition read request, the memory controller transmits, to the host, the boot data stored in a boot partition corresponding to the ABPID.

DETAILED DESCRIPTION

The embodiments of the disclosed technology relate to a data storage device that can perform an efficient booting operation.

Figure 1:
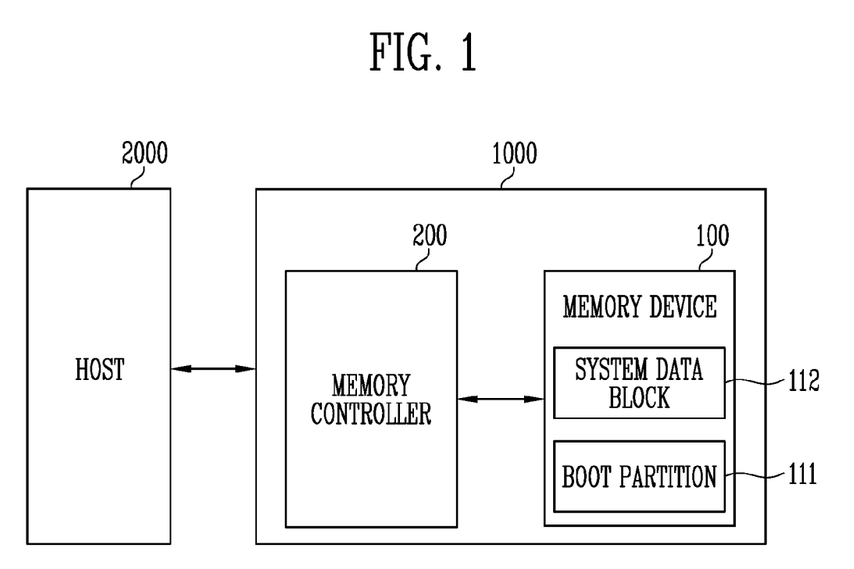
FIG. 1 is a diagram illustrating an example of a storage device based on an embodiment of the disclosed technology.

FIG. 1 is a diagram illustrating an example of a storage device based on an embodiment of the disclosed technology.

Referring to FIG. 1, the storage device 1000 may include a memory device 100 and a memory controller 200. The storage device 1000 may be a device for storing data under the control of a host 2000, such as a mobile phone, a smart phone, an MP3 player, a laptop computer, a desktop computer, a game console, a display device, a tablet PC or an in-vehicle infotainment. In this patent document, the term "storage device" is used to indicate a data storage device.

The storage device 1000 may be manufactured as any one of various types of storage devices according to a host interface that is a communication scheme with the host 2000. For example, the storage device 1000 may be implemented with any one of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 1000 may be implemented as any one of various kinds of package types. For example, the storage device 1000 may be implemented as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data or read stored data. Specifically, the memory device 100 operates under the control of the memory controller 200. Also, the memory device 100 may include a plurality of memory dies, and each of the plurality of memory dies may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks. Each memory block may include a plurality of memory cells, and one memory block may include a plurality of pages. The page may be a unit for storing data in the memory device 100 or reading data stored in the memory device 100.

The memory device 100 may be implemented as a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 may receive a command and an address from the memory controller 200. The memory device 100 may access an area selected by the received address in the memory cell array. That the memory device 100 accesses the selected area may mean that the memory device 100 performs an operation corresponding to the received command on the selected area. For example, the memory device 100 may perform a write operation (program operation), a read operation, and an erase operation. The program operation may be an operation in which the memory device 100 records data in the area selected by the address. The read operation may mean an operation in which the memory device 100 reads data from the area selected by the address. The erase operation may mean an operation in which the memory device 100 erases data stored in the area selected by the address.

The memory controller 200 may control overall operations of the storage device 1000.

When power is applied to the storage device 1000, the memory controller 200 may execute firmware (FW). The FW may include a Host Interface Layer (HIL) which receives a request input from the host 2000 or outputs a response to the host 2000, a Flash Translation Layer (FTL) which manages an operation between an interface of the host 2000 and an interface of the memory device 100, and a Flash Interface Layer (FIL) which provides a command to the memory device 100 or receives a response from the memory device 100.

The memory controller 200 may receive data and a Logical Address (LA) from the host 2000, and translate the LA into a Physical Address (PA) representing an address of memory cells included in the memory device 100, in which data is to be stored. The LA may be a Logical Block Address (LBA), and the PA may be a Physical Block Address (PBA).

The memory controller 200 may control the memory device 100 to perform a program operation, a read operation, an erase operation, or the like in response to a request from the host 2000. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

The memory controller 200 may control the memory device 100 to autonomously perform a program operation, a read operation, or an erase operation regardless of any request from the host 2000. For example, the memory controller 200 may control the memory device 100 to perform a program operation, a read operation, or an erase operation, which is used to perform a background operation such as wear leveling, garbage collection, or read reclaim. Specifically, the memory controller 200 may autonomously generate a command, an address, and data regardless of any request from the host 2000, and transmit the generated command, the generated address, and the generated data to the memory device 100. That is, the memory controller 200 may provide the memory device 100 with a command, an address, and data, which are used to perform a background operation such as wear leveling, garbage collection, or read reclaim.

In an embodiment, the memory controller 200 may control at least two memory devices 100. The memory controller 200 may control the memory devices according to an interleaving scheme so as to improve operational performance. The interleaving scheme may be a scheme for controlling operations on at least two memory devices 100 to overlap with each other.

In an embodiment of the disclosed technology, the memory controller 200 may perform a rebuild operation to restore system data stored in the memory device 100. In some implementations, a booting operation may include the rebuild operation. In one example, the rebuild operation includes preparing an initial setup for the host 2000 to execute an operating system (OS) so that the storage device 1000 can process a request received from the host 2000.

In some implementations, when power is supplied to the storage device 1000 (power on), the memory controller 200 may load system data stored in the memory device 100 to another memory such as a buffer memory in the memory controller 200. The system data may include setup information required for the memory controller 200 to control the storage device 1000. For example, the system data may include setup data used for an operation of the firmware (FW) of the memory controller 200. In another implementation, the system data may include setup information or data, which includes a parameter that is used to perform an internal operation (e.g., a read operation, a write operation, or an erase operation) of the memory device 100 according to a request (e.g., a read request, a write request, or an erase request) from the host 2000. For example, the system data may include information on bad blocks among the plurality of memory blocks included in the memory device 100. As another example, the system data may include map data to indicate a mapping relationship between a logical address provided from the host 2000 and a physical address of memory cells included in the memory device 100. The system data may also include valid page table data to indicate whether data stored in pages included in the memory device 100 is valid data. In addition, the system data may include read count data that indicates a number of read operations that are performed on memory blocks included in the memory device 100, cycling data that indicates a number of memory blocks included in the memory device 100 that are erased, hot/cold data that indicates whether data stored in pages included in the memory device 100 is hot data or cold data, and journal data that indicates changes in the contents of the map data. In some implementations, the system data may include storage space information, fail information on read/program, security information for security and encryption of a system, and others.

In an embodiment of the disclosed technology, the storage device 1000 may support a boot partition function. The boot partition function may include providing a boot loader to be executed on a ROM of the host 2000. Specifically, the memory device 100 may include a boot partition 111. In one example, the boot partition 111 may be accessed by the host 2000 using a queue of the memory controller 200. In another example, the boot partition 111 may be accessed by the host 2000 without using a queue of the memory controller 200 or without performing initialization on the memory controller 200. In an embodiment, boot data stored in the boot partition 111 includes system data that can be used to execute the OS. Also, the boot partition 111 may be allocated to some of the memory blocks included in the memory device 100.

The boot partition 111 may be accessed by commands that are different from commands that are used to access other memory blocks (e.g., memory blocks storing user data) included in the memory device 100. That is, the host 2000 may access the boot partition 111 by using a dedicated command for accessing the boot partition 111.

In an embodiment, the host 2000 may store a secondary OS in the boot partition 111, and load the secondary OS if necessary. That is, the boot partition 111 and the boot data stored in the boot partition 111 may be provided as means for allowing the host 2000 to boot in a new booting environment.

In an embodiment, a dedicated command for accessing the boot partition 111 may be used for the boot loader to boot with the secondary OS. That is, the boot partition 111 may allow the host 2000 to boot with a free OS or another available OS by using only the boot data stored in the boot partition 111 without storing a booting image stored in the storage device 1000 in another storage area.

In an embodiment, the memory controller 200 may store data in the boot partition 111 or provide data stored in the boot partition 111 to the host 2000. Also, the memory controller 200 may access the boot partition 111 according to a request of the host 2000.

In an embodiment, even in a case that any request of the host 2000 is not received, when power is supplied to the storage device, the memory controller 200 may control the memory device 100 to read the boot data stored in the boot partition 111. That is, the memory controller 200 may control the memory device 100 to read the boot data stored in the boot partition 111 in advance before a request of the host 2000 is received.

The host 2000 may communicate with the storage device 1000, using at least one of various communication manners, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment of the disclosed technology, the storage device 1000 may rapidly transfer active boot partition information on the boot partition 111 such as Active Boot Partition ID (ABPID) in an activated state to the host 2000, and the host 2000 may rapidly perform a booting operation by using the boot data stored in the boot partition 111. In an embodiment of the disclosed technology, the storage device 1000 may perform a rebuild operation to restore system data including information on the activated boot partition 111, and implement a faster booting operation compared to the existing booting operation.

In an embodiment of the disclosed technology, the storage device 1000 may include a system data block 112. The system data block 112 may store system data including information on the activated boot partition 111, such as active boot partition information (e.g., ABPID). The system data may include setup information required for the memory controller 200 to control the storage device 1000. For example, the system data may include setup data used for an operation of the FW of the memory controller 200. In another implementation, the system data may include setup information or data, which includes a parameter required to perform an internal operation (e.g., a read operation, a write operation, or an erase operation) of the memory device 100 according to a request (e.g., a read request, a write request, or an erase request) from the host 2000. In another implementation, the system data may include meta data that includes mapping information of addresses of a plurality of memory blocks included in the memory device 100. For example, the system data may include bad block data as information on a bad block among the plurality of memory blocks included in the memory device 100, and include map data to indicate a mapping relationship between a logical address provided from the host 2000 and a physical address of memory cells included in the memory device 100. The system data may also include valid page table data to indicate whether data stored in pages included in the memory device 100 is valid data. In addition, the system data may include read count data that indicates a number of read operations that are performed on memory blocks included in the memory device 100, cycling data that indicates a number of memory blocks included in the memory device 100 are erased, hot/cold data that indicates whether data stored in pages included in the memory device 100 is hot data or cold data, and journal data that indicates changes in the contents of the map data. In some implementations, the system data may include storage space information, fail information on read/program, security information for security and encryption of a system, and others.

Figure 2:
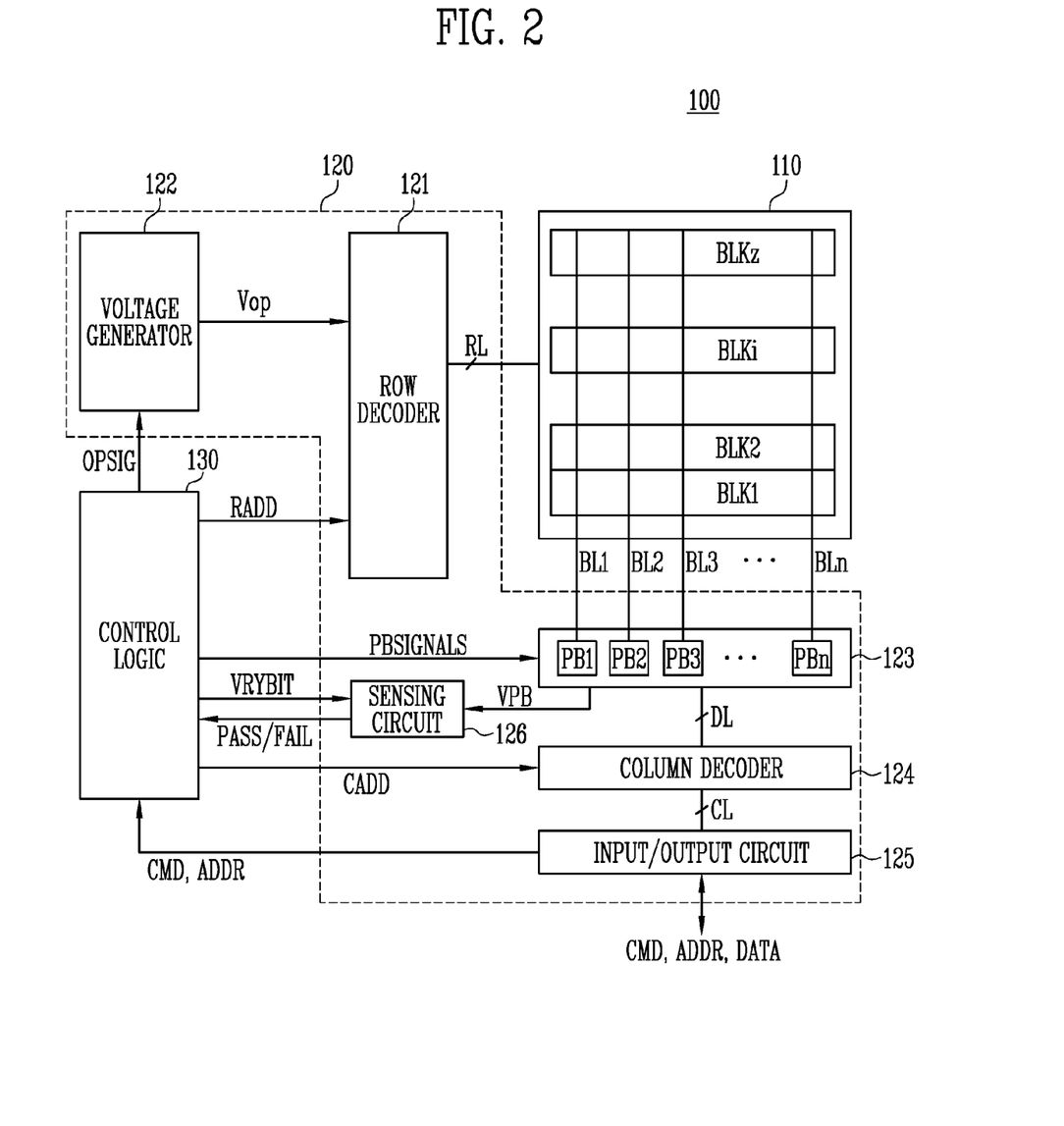
FIG. 2 is a block diagram illustrating an example of a memory device based on an embodiment of the disclosed technology.

FIG. 2 is a block diagram illustrating an example of a memory device based on an embodiment of the disclosed technology.

Referring to FIG. 2, the memory device 100 may include a memory cell array 110, a peripheral circuit 120, and a control logic 130.

The memory cell array 110 includes a plurality of memory blocks BLK1 to BLKz. The memory blocks BLK1 to BLKz are connected to a row decoder 121 through row lines RL. The row lines RL may include at least one source select line, a plurality of word lines, and at least one drain select line. The memory blocks BLK1 to BLKz are connected to a page buffer group 123 through bit lines BL1 to BLn. Each of the memory blocks BLK1 to BLKz includes a plurality of memory cells. In an embodiment, the plurality of memory cells may be nonvolatile memory cells. Memory cells connected to the same word line may be defined as one page. Therefore, one memory block may include a plurality of pages.

Each of the memory cells included in the memory cell array 110 may be configured as a single level cell (SLC) storing one data bit, a multi-level cell (MLC) storing two data bits, a Triple Level Cell (TLC) storing three data bits, or a quadruple level cell (QLC) storing four data bits.

The peripheral circuit 120 may be configured to perform a program operation, a read operation or an erase operation on a selected area of the memory cell array 110 under the control of the control logic 130. That is, the peripheral circuit 120 may activate the memory cell array 110 under the control of the control logic 130. For example, the peripheral circuit 120 may apply various operating voltages to the row lines RL and the bit lines BL1 to BLn or discharge the applied voltages under the control of the control logic 130.

Specifically, the peripheral circuit 120 may include the row decoder 121, a voltage generator 122, the page buffer group 123, a column decoder 124, an input/output circuit 125, and a sensing circuit 126.

The row decoder 121 may be connected to the memory cell array 110 through the row lines RL. The row lines RL may include at least one source select line, a plurality of word lines, and at least one drain select line. In an embodiment, the word lines may include normal word lines and dummy word lines. In an embodiment, the row lines RL may further include a pipe select line.

The row decoder 121 may operate under the control of the control logic 130. The row decoder 121 may receive a row address RADD from the control logic 130. Specifically, the row decoder 121 may decode the row address RADD. The row decoder 121 may select at least one memory block among the memory blocks BLK1 to BLKz according to the decoded address. Also, the row decoder 121 may select at least one word line of the selected memory block to apply voltages generated by the voltage generator 122 to the at least one word line WL according the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In an embodiment, an erase operation of the memory device 100 may be performed in a memory block unit. In the erase operation, the row decoder 121 may select one memory block according to the decoded address. In the erase operation, the row decoder 121 may apply a ground voltage to word lines connected to the selected memory block.

The voltage generator 122 may operate under the control of the control logic 130. Specifically, the voltage generator 122 may generate a plurality of voltages by using an external power voltage supplied to the memory device 100 under the control of the control logic 130. For example, the voltage generator 122 may generate a program voltage, a verify voltage, a pass voltage, a read voltage, an erased voltage, and the like under the control of the control logic 130. That is, the voltage generator 122 may generate various operating voltages Vop used in program, read, and erase operations in response to an operation signal OPSIG.

In an embodiment, the voltage generator 122 may generate an internal power voltage by regulating the external power voltage. The internal power voltage generated by the voltage generator 122 may be used as an operation voltage of the memory cell array 110.

In an embodiment, the voltage generator 122 may generate a plurality of voltages by using the external power voltage or the internal power voltage. For example, the voltage generator 122 may include a plurality of pumping capacitors for receiving the internal power voltage, and generate the plurality of voltages by selectively activating the plurality of pumping capacitors under the control of the control logic 130. In addition, the plurality of generated voltages may be supplied to the memory cell array 110 by the row decoder 121.

The page buffer group 123 may include first to nth page buffers PB1 to PBn. The first to nth page buffers PB1 to PBn may be connected to the memory cell array 110 respectively through first to nth bit lines BL1 to BLn. Also, the first to nth bit lines BL1 to BLn may operate under the control of the control logic 130. Specifically, the first to nth bit lines BL1 to BLn may operate in response to page buffer control signals PBSIGNALS. For example, the first to nth page buffers PB1 to PBn may temporarily store data received through the first to nth bit lines BL1 to BLn, or sense a voltage or current of the bit lines BL1 to BLn in a read or verify operation.

Specifically, in a program operation, the first to nth page buffers PB1 to PBn may transfer data DATA received through the input/output circuit 125 to selected memory cells through the first to nth bit lines BL1 to BLn, when a program voltage is applied to a selected word line. Memory cells of a selected page may be programmed according to the transferred data DATA. A memory cell connected to a bit line to which a program allow voltage (e.g., a ground voltage) is applied may have an increased threshold voltage. A threshold voltage of a memory cell connected to a bit line to which a program inhibit voltage (e.g., a power voltage) is applied may be maintained.

In a program verify operation, the first to nth page buffers PB1 to PBn may read page data from the selected memory cells through the first to nth bit lines BL1 to BLn.

In a read operation, the first to nth page buffers PB1 to PBn may read data DATA from the memory cells of the selected page through the first to nth bit lines BL1 to BLn, and outputs the read data DATA to the input/output circuit 125 under the control of the column decoder 124.

In an erase operation, the first to nth page buffers PB1 to PBn may float the first to nth bit lines BL1 to BLn.

The column decoder 124 may communicate data between the input/output circuit 125 and the page buffer group 123 in response to a column address CADD. For example the column decoder 124 may communicate data with the first to nth page buffers PB1 to PBn through data lines DL, or communicate data with the input/output circuit 125 through column lines CL.

The input/output circuit 125 may transfer a command CMD and an address ADDR, which are received from the memory controller 200, to the control logic 130, or exchange data DATA with the column decoder 124.

In a read operation or verify operation, the sensing circuit 126 may generate a reference current in response to an allow bit VRYBIT signal, and output a pass PASS or a fail signal FAIL by comparing a sensing voltage VPB received from the page buffer group 123 and a reference voltage generated by the reference current.

The control logic 130 may control the peripheral circuit 120 by outputting the operation signal OPSIG, the row address RADD, the page buffer control signals PBSIGNALS, and the allow bit VRYBIT in response to the command CMD and the address ADDR. Also, the control logic 130 may determine whether the verify operation has passed or failed in response to the pass or fail signal PASS or FAIL. Also, the control logic 130 may control the page buffer group 123 to temporarily store verify information including the pass or fail signal PASS or FAIL in the page buffer group 123.

In an embodiment of the disclosed technology, the memory device 100 may include a boot partition 111. In one example, the boot partition 111 may be allocated to some of the plurality of memory blocks included in the memory cell array 110. In an embodiment, the boot partition 111 may be accessed by commands that are different from commands that are used to access other memory blocks (e.g., memory blocks storing user data) included in the memory device 100.

In an embodiment, the memory cell array 110 may include a system block storing system data. The system block may be implemented to have an identical structure to a memory block that stores user data transmitted from the host 2000.

In an embodiment, the system data stored in the system block may be transmitted from the memory device 100 to the memory controller 200 by a rebuild operation. The rebuild operation is a part of a booting operation, and may include preparing an initial setup for the host 2000 to execute an operating system (OS) so that the storage device 1000 can process a request received from the host 2000.

Figure 3:
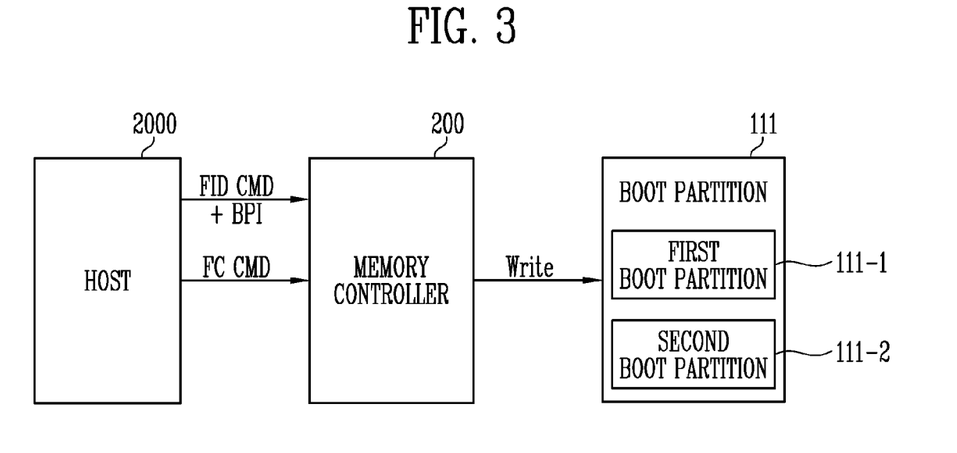
FIG. 3 is a diagram illustrating an example of storing data in a boot partition based on an embodiment of the disclosed technology.

FIG. 3 is a diagram illustrating an example of storing data in the boot partition based on an embodiment of the disclosed technology.

Referring to FIG. 3, the boot partition 111 may include a first boot partition 111-1 and a second boot partition 111-2. In addition, the first boot partition 111-1 and the second boot partition 111-2 may have storage devices having the same size. For example, one boot partition (e.g., 111-1 or 111-2) may have a size of 32 MB. In an embodiment, one boot partition (e.g., 111-1 or 111-2) may have a size smaller than that of one memory block included in the memory device 100. In various embodiments, boot partitions may have storage devices having different sizes.

In an embodiment of the disclosed technology, the first boot partition 111-1 and the second boot partition 111-2 are areas independent from each other, and store different boot data. In another implementation, the first boot partition 111-1 and the second boot partition 111-2 may store the same data for a reason of backup and security.

The host 2000 may store data in the boot partition 111 by using a dedicated command. For example, the host 2000 may store data in the boot partition 111 by using a firmware image download command and a firmware commit command. In various embodiments, the boot partition 111 may be accessed only when authentication is performed by an authentication key.

Specifically, the host 2000 may issue a firmware image download command FID CMD to the memory controller 200 so as to provide the memory controller 200 with a boot partition image BPI to be stored in the boot partition 111. In an embodiment, the boot partition image BPI which is to be provided to the boot partition 111 by the host 2000 may include a plurality of parts. Therefore, offsets of the respective parts may be included in a firmware image download command. In addition, the host 2000 may provide the memory controller 200 the boot partition image BPI to be stored in the boot partition 111. In an embodiment, the memory controller 200 and the host 2000 may authenticate access to the boot partition 111 and set the boot partition 111 to be in an unlocked state so as to store the data in the boot partition 111.

Subsequently, the host 2000 may provide a firmware commit command FC CMD to instruct the memory controller to replace or update contents of the boot partition 111 with the provided boot partition image BPI. In an embodiment, the firmware commit command FC CMD may include information on a boot partition ID BPID to be replaced. In addition, the memory controller 200 may replace the contents of the boot partition 111 with the boot partition image BPI, based on the information on the boot partition ID BPID, which is provided from the host 2000. For example, the host 2000 may issue the firmware commit command FC CMD to the memory controller 200 such that the firmware commit command FC CMD include information on an ID BPID of the first boot partition 111-1, and the memory controller 200 may replace data stored in the first boot partition 111-1 with a new boot partition image BPI according to the firmware commit command FC CMD.

Figure 4:
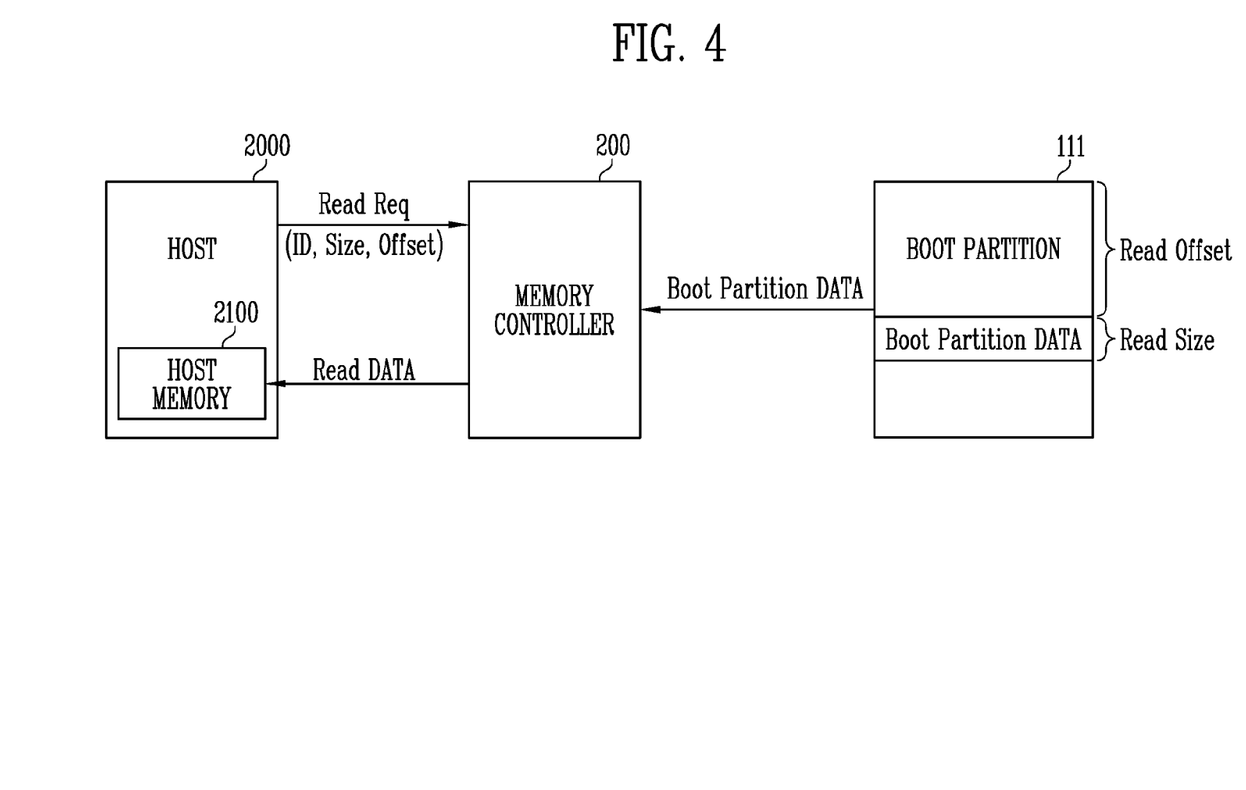
FIG. 4 is a diagram illustrating an example of reading data stored in the boot partition based on an embodiment of the disclosed technology.

FIG. 4 is a diagram illustrating an example of reading data stored in the boot partition based on an embodiment of the disclosed technology.

Referring to FIG. 4, the host 2000 may include a host memory 2100. The host memory 2100 is a buffer memory, and may be a volatile memory device. For example, the host memory 2100 may be a dynamic random access memory (DRAM) or a static random access memory (SRAM).

The host 2000 may allocate a boot partition memory buffer in the host memory 2100 such that the memory controller 200 can copy data stored in the boot partition 111. Specifically, the host 2000 may initialize a basic address of the boot partition memory buffer. Also, the host 2000 may set an address of the allocated boot partition memory buffer, a boot partition ID to be read, a read size, and a read offset. Also, the host 2000 may provide a read request to the memory controller 200, based on the address of the allocated boot partition memory buffer, the boot partition ID to be read, the read size, and/or the read offset. The memory controller 200 may sequentially read the data stored in the boot partition 111, which is requested by the host 2000, and provide the read data to the host memory 2100.

Figure 5:
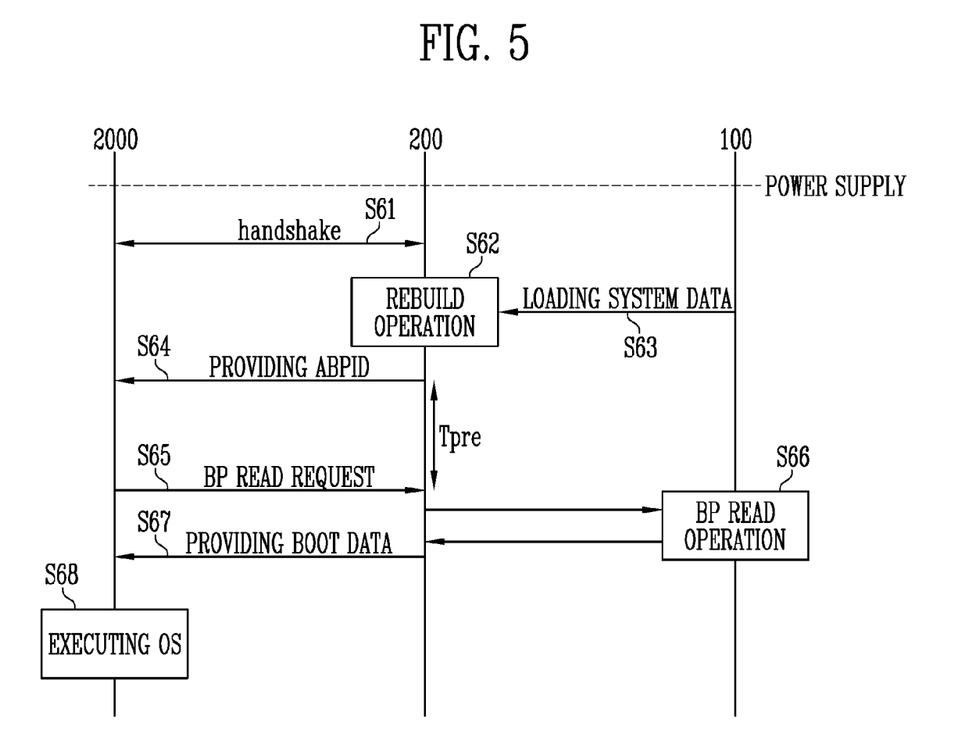
FIG. 5 is a diagram illustrating operations that are performed between the storage device and a host based on an embodiment of the disclosed technology.

FIG. 5 is a diagram illustrating operations that are performed between the storage device and the host based on an embodiment of the disclosed technology.

Referring to FIG. 5, operations of the host 2000, the memory device 100, and the memory controller 200 are illustrated according to the passage of time.

First, power may be supplied to the host 2000, the memory device 100, and the memory controller 200. In addition, each of the host 2000, the memory device 100, and the memory controller 200 may perform a booting operation. The booting operation may include preparing an initialization setup such that, after the power is supplied, the host 2000 can execute an operating system and the storage device 1000 can process a request received from the host 2000.

In addition, the host 2000 and the memory controller 200 may perform transmission synchronization by using a flag, a message packet, and others or perform handshake including transmission/reception of a connection request signal, and others (S61). The host 2000 and the memory controller 200 may check communication preparation of another side and the degree of restoration through the handshake.

In addition, the memory controller 200 may perform a rebuild operation to restore system data stored in the memory device 100 (S62). The rebuild operation is a part of a booting operation, and may include restoring to a normal state after power is supplied. In an embodiment, the memory controller 200 may perform the rebuild operation to restore system data including active boot partition information such as an Active Boot Partition ID (ABPID) that includes information on an activated boot partition among boot partitions included in the memory device 100. The memory controller 200 may load the system data, which is stored in the memory device 100, during the rebuild operation (S63). In an embodiment, the rebuild operation may also be performed in the memory device 100 while the memory controller 200 is performing the rebuild operation. In an embodiment, the memory device 100 and the memory controller 200 may perform the rebuild operation regardless of whether there is any request or instruction from the host 2000. In an embodiment, the memory controller 200 may generate the ABPID by restoring the system data including status information of the boot partition. A method of generating the ABPID will be described in detail with reference to FIG. 7. In an embodiment, the memory controller 200 may restore, together with the ABPID, the system data required to perform an internal operation (e.g., a read operation, a write operation, or an erase operation) of the memory device 100 and the memory controller 200 according to a read request, a write request, or an erase request from the host 2000.

In addition, when the system data including the ABPID is stored, the memory controller 200 may provide the ABPID to the host 2000 (S64). Also, after the ABPID is provided to the host 2000, the memory controller 200 may continue a subsequent rebuild operation to restore the other system data. In an embodiment, system data required to perform a background operation of the memory device 100 and the memory controller 200 may be restored in the subsequent rebuild operation.

In an embodiment, in order for the host 2000 to perform an efficient booting operation, the memory controller 200 may perform, in advance, an operation for performing a boot partition read request corresponding to the ABPID for a time Tpre until the boot partition read request is received, after the ABPID is transmitted to the host 2000. Specifically, the memory controller 200 may perform a rebuild operation for transmitting data stored in a boot partition before the boot partition read request is received from the host 2000. Alternatively, the memory controller 200 may control the memory device 100 to read data stored in a boot partition corresponding to the ABPID so as to reduce a booting time.

When the boot partition read request is received from the host 2000 (S65), the memory controller 200 may control the memory device 100 to perform a boot partition read operation. Specifically, the memory controller 200 may control the memory device 100 to read a boot partition corresponding to the boot partition read request, and the memory device 100 may perform the boot partition read operation under the control of the memory controller 200 (S66).

In addition, the memory controller 200 may provide the host 2000 with a result obtained by performing the boot partition read operation. Specifically, the memory controller 200 may provide the host 2000 with boot data stored in the boot partition (S67). The boot data is a kind of system data, and may be data for executing an Operating System (OS).

In addition, the host 2000 may execute the OS by using the boot data (S68). The host 2000 and the storage device 1000 may restore the boot data for executing the OS and system data including a boot parameter, so that the booting operation can be rapidly performed. In one example, the restoration of the boot data has the highest priority over other operations. That is, the storage device 1000 and the host 2000 may continue a rebuild operation to restore data even after the OS is executed.

Figure 6:
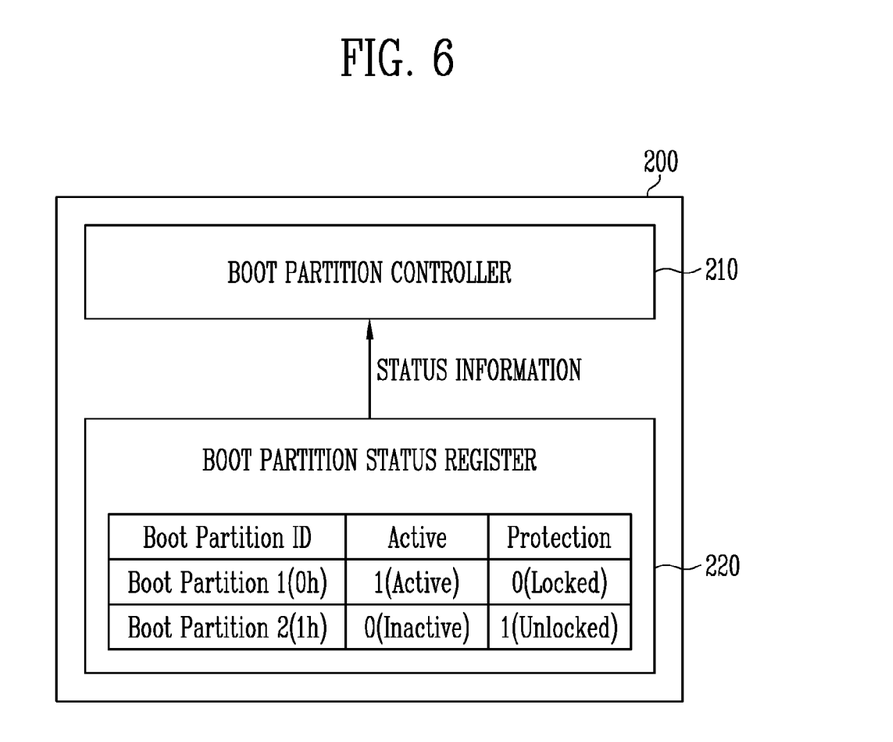
FIG. 6 is a diagram illustrating an example of a memory controller based on an embodiment of the disclosed technology.

FIG. 6 is a diagram illustrating an example of a memory controller based on an embodiment of the disclosed technology.

Referring to FIG. 6, the memory controller 200 may include a boot partition controller 210 and a boot partition status register 220.

The boot partition controller 210 may store boot data in the boot partition 111 according to a request of the host 2000. In an embodiment, the boot data may be used to execute an operating system (OS) of the host 2000. That is, the boot data may include data that is associated with booting of the host 2000. In an embodiment, the boot partition controller 210 may control the memory device 100 to store data in boot partitions or to read data stored in the boot partitions under the control of the host 2000. That is, the boot partition controller 210 may set a locked state of the boot partition 111 to be locked or unlocked, and store data in the corresponding boot partition 111 in a state in which the corresponding boot partition is unlocked.

In an embodiment of the disclosed technology, the boot partition controller 210 may activate or deactivate the boot partition 111. Status information that indicates the boot partition 111 is in an activated state may be stored in the boot partition status register 220.

In an embodiment, the boot partition controller 210 may generate an Active Boot Partition ID (ABPID) based on the status information stored in the boot partition status register 220. Since the boot partition controller 210 acquires the status information from the boot partition status register 220, the boot partition controller 210 may generate, based on the status information, the ABPID to indicate an activated boot partition.

In an embodiment, the boot partition status register 220 may store status information of the boot partition 111. Specifically, the boot partition status register 220 may store information on whether the boot partition 111 is activated, an ID of the boot partition 111, and/or whether the boot partition 111 is locked. That is, the status information of the boot partition 111 may include at least one of a boot partition ID, activation information representing whether the boot partition 111 is activated, and lock information representing whether data stored in the boot partition 111 is protected.

The boot partition ID may be specific numbers for identifying each of a plurality of boot partitions. The activation information may indicate whether the boot partition is available. Alternatively, the activation information may be used to indicate whether the data stored in the boot partition 111 is reliable. The activation information in an active state may indicate whether all or part of the boot partition information has been normally stored. For example, when the first boot partition in the boot partition 111 is in an activated state, data stored in the first boot partition is reliable. Alternatively, when the second boot partition is in an inactivated state, specific data stored in the second boot partition is not reliable even when the specific data is stored in the second boot partition. Therefore, the data stored in the second boot partition is not available.

The lock information may indicate whether the data stored in the boot partition 111 is under protection. Specifically, when the boot partition 111 is in a locked state, the host 2000 or the memory controller 200 may store data in the boot partition 111 in the locked state. Since the data stored in the boot partition 111 in the locked state is not reliable, the corresponding boot partition 111 may be inactivated when the data is stored in the corresponding boot partition 111 in the locked state. In addition, the host 2000 may set the locked state of the boot partition 111 to become an unlocked state through authentication before the data is stored in the boot partition 111. The host 200 may set the unlocked state of the boot partition 111 to become the locked state, after the data is stored in the boot partition 111 in the unlocked state.

Figure 7:
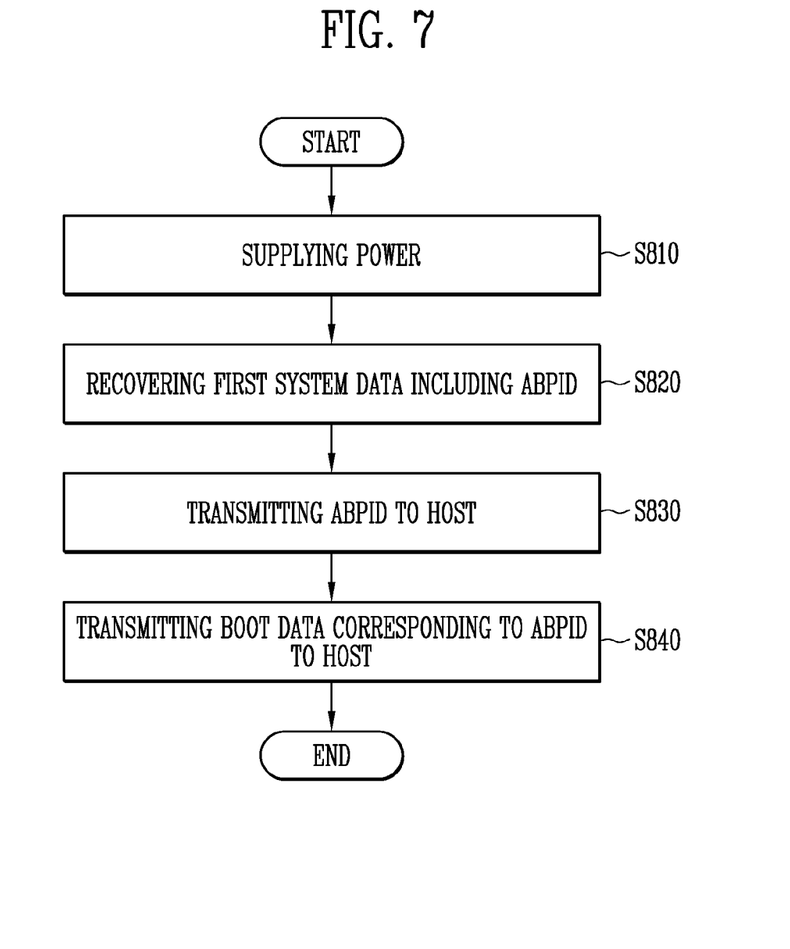
FIG. 7 is a diagram illustrating an example of an operating method of the storage device based on an embodiment of the disclosed technology.

FIG. 7 is a diagram illustrating an example of an operating method of the storage device based on an embodiment of the disclosed technology.

Referring to FIG. 7, the storage device 1000 may include a memory device 100 and a memory controller 200, and the memory device 100 may include boot partitions storing boot data for executing an operating system.

When power is supplied to the storage device 1000 (S810), the storage device 1000 may restore first system data including an Active Boot Partition ID (ABPID) (S820). Specifically, the storage device 1000 may perform a rebuild operation to restore the first system data including the ABPID representing information on an activated boot partition among boot partitions. In an embodiment, the first system data may be used to perform an internal operation of the storage device 1000 according to a read request, a write request, or an erase request from the host 2000. In an embodiment, the storage device 1000 may restore status information of the boot partitions, when the first system data is restored. Also, the storage device 1000 may generate the ABPID, based on the status information. The status information may include at least one of whether the boot partitions are activated, IDs of the boot partitions, and whether the boot partitions are locked. The storage device 1000 may transmit the ABPID to the host 2000 (S830).

Also, the storage device 1000 may transmit boot data corresponding to the ABPID to the host 2000 (S840). Specifically, when a boot partition read request based on the ABPID is received from the storage device 1000, the storage device 1000 may transmit, to the host 2000, boot data stored in a boot partition corresponding to the ABPID. In various embodiments, the storage device 1000 may read the boot data stored in the boot partition corresponding to ABPID, before the boot partition read request is received from the host 2000.

In an embodiment, after the first system data is recovered, the storage device 1000 may recover second system data including system data required to perform a background operation of the storage device 1000.

Figure 8:
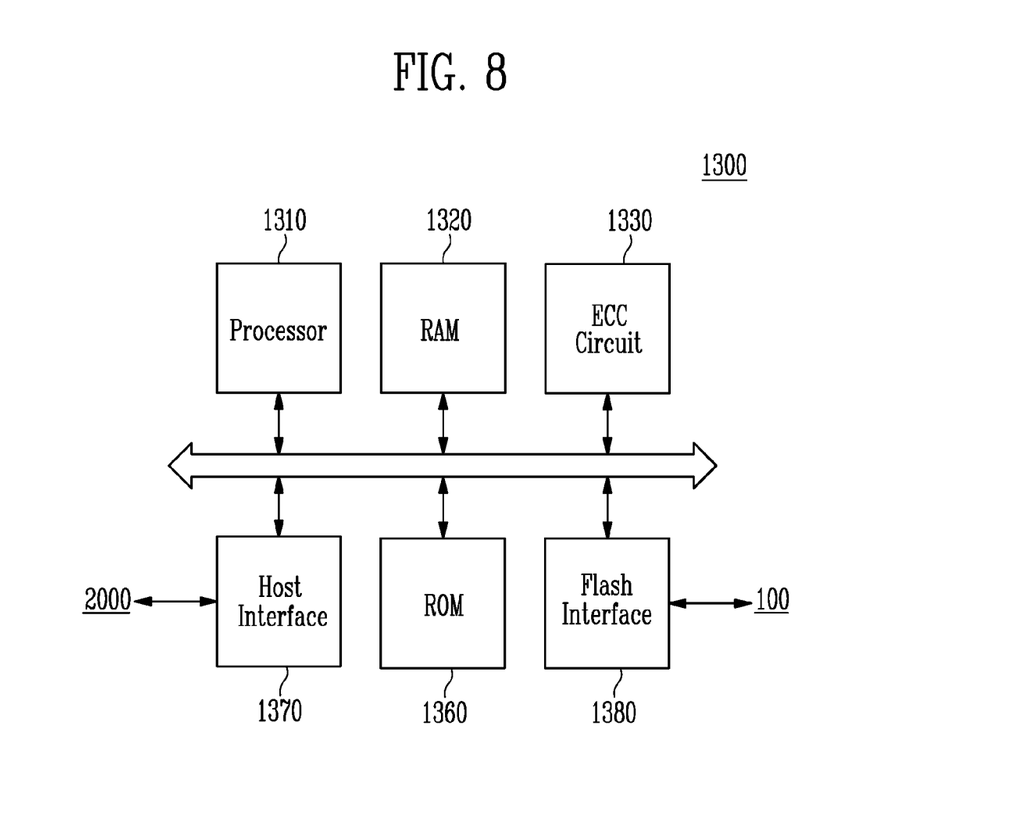
FIG. 8 is a diagram illustrating an example of a memory controller based on another embodiment of the disclosed technology.

FIG. 8 is a diagram illustrating an example of a memory controller based on another embodiment of the disclosed technology.

Referring to FIG. 8, a configuration of the memory controller 1300 is illustrated. In an embodiment of the disclosed technology, the memory controller 1300 may perform a rebuild operation of recovering system data stored in the memory device 100. That is, the memory controller 1300 shown in FIG. 8 may be an embodiment of the memory controller 200 shown in FIG. 1. The memory controller 1300 may include a processor 1310, a RAM 1320, and an ECC circuit 1330, a ROM 1360, a host interface 1370, and a flash interface 1380.

The processor 1310 may communicate with the host 2000 by using the host interface 1370, and perform a logical operation to control an operation of the memory controller 1300. For example, the processor 1310 may load a program command, a data file, a data structure, etc., based on a request received from the host 2000 or an external device, and perform various operations or generate a command and an address. For example, the processor 1310 may generate various commands necessary for a program operation, a read operation, an erase operation, a suspend operation, and a parameter setting operation.

Also, the processor 1310 may perform a function of a Flash Translation Layer (FTL). The processor 250 may translate a Logical Block Address (LBA) provided by the host 2000 into a Physical Block Address (PBA) through the FTL. The FTL may receive an LBA input by using a mapping table, to translate the LBA into a PBA. Several address mapping methods of the FTL exist according to mapping units. A representative address mapping method includes a page mapping method, a block mapping method, and a hybrid mapping method.

Also, the processor 1310 may generate a command without any request from the host 2000. For example, the processor 1310 may generate a command for background operations such as operations for wear leveling of the memory device 100 and operations for garbage collection of the memory device 100.

The RAM 1320 may be used as a buffer memory, a working memory, or a cache memory of the processor 1310. Also, the RAM 1320 may store codes and commands, which the processor 1310 executes. The RAM 1320 may store data processed by the processor 1310. Also, the RAM 1320 may be implemented, including a Static RAM (SRAM) or a Dynamic RAM (DRAM).

The ECC circuit 1330 may detect an error in a program operation or a read operation, and correct the detected error. Specifically, the ECC circuit 1330 may perform an error correction operation according to an Error Correction Code (ECC). Also, the ECC circuit 1330 may perform ECC encoding, based on data to be written to the memory device 100. The data on which the ECC encoding is performed may be transferred to the memory device 100 through the flash interface 1380. Also, the ECC circuit 1330 may perform ECC decoding on data received from the memory device 100 through the flash interface 1380.

The ROM 1360 may be used as a storage unit for storing various information necessary for an operation of the memory controller 1300. Specifically, the ROM 1360 may include a map table, and physical-to-logical address information and logical-to-physical address information may be stored in the map table. Also, the ROM 1360 may be controlled by the processor 1310.

The host interface 1370 may include a protocol for exchanging data between the host 2000 and the memory controller 1300. Specifically, the host interface 1370 may communicate with the host 2000 through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a private protocol.

The flash interface 1380 may communicate with the memory device 100 by using a communication protocol under the control of the processor 1310. Specifically, the flash interface 1380 may communicate a command, an address, and data with the memory device 100 through a channel. For example, the flash interface 1380 may include a NAND interface.

Figure 9:
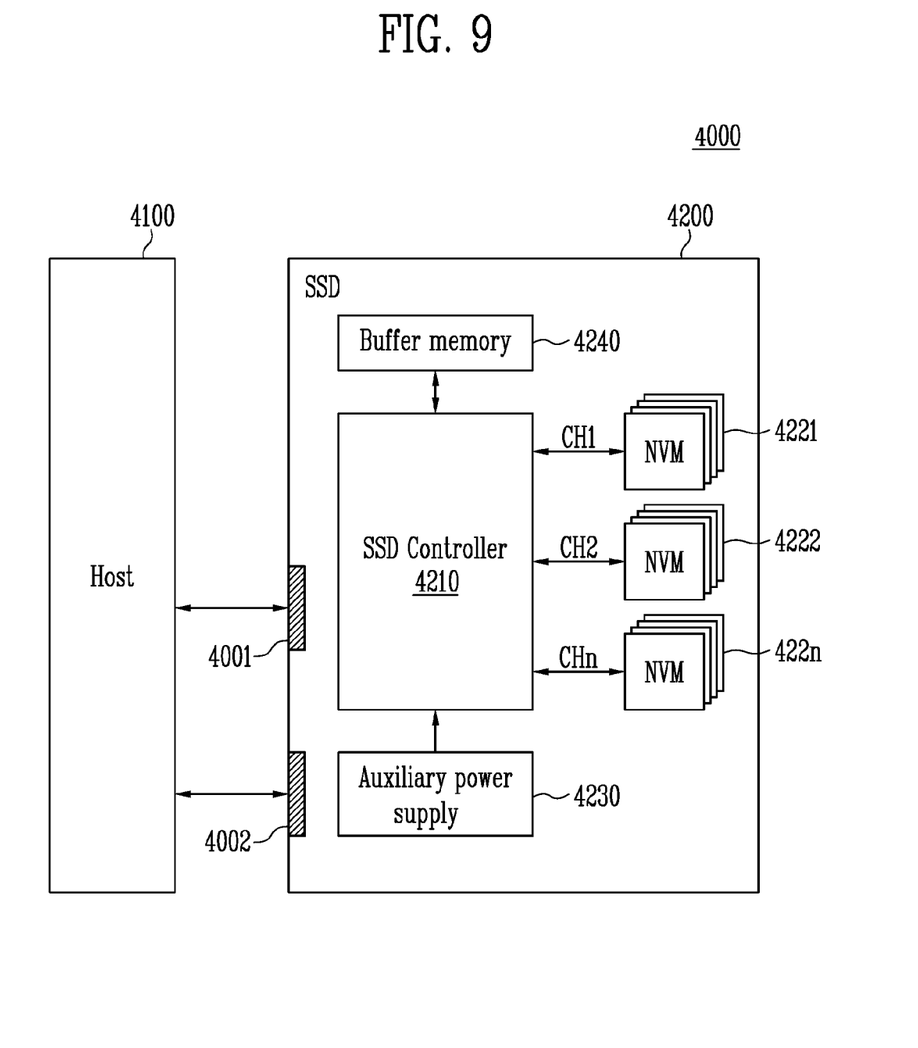
FIG. 9 is a diagram illustrating an example of a solid state drive (SSD) based on an embodiment of the disclosed technology.

FIG. 9 is a diagram illustrating an example of a solid state drive (SSD) based on an embodiment of the disclosed technology.

Referring to FIG. 9, the SSD system 4000 includes a host 4100 and an SSD 4200. The SSD 4200 exchanges a signal SIG with the host 4100 through a signal connector 4001, and receives power PWR through a power connector 4002. The SSD 4200 includes an SSD controller 4210, a plurality of flash memories 4221 to 422n, an auxiliary power supply 4230, and a buffer memory 4240.

In an accordance with an embodiment of the disclosed technology, the SSD 4200 may support functions of the storage device 1000 described with reference to FIG. 1. Specifically, the SSD controller 4210 may serve as the memory controller 200 described with reference to FIG. 1. The SSD controller 4210 may perform a rebuild operation of recovering system data stored in the plurality of flash memories 4221 to 422n. The rebuild operation is a part of a booting operation, and may mean an operation of preparing an initial setup such that the host 4100 can execute an Operating System (OS) and the SSD 4200 can process a request received from the host 4100.

The SSD controller 4210 may control the plurality of flash memories 4221 to 422n in response to a signal SIG received from the host 4100. Exemplarily, the signal SIG may be a signal based on an interface between the host 4100 and the SSD 4200. For example, the signal SIG may be a signal defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 4230 may be connected to the host 4100 through the power connector 4002. The auxiliary power supply 4230 may receive power PWR input from the host 4100 and charge the power PWR. When the supply of power from the host 4100 is not smooth, the auxiliary power supply 4230 may provide power of the SSD 4200. Exemplarily, the auxiliary power supply 4230 may be located in the SSD 4200, or be located at the outside of the SSD 4200. For example, the auxiliary power supply 4230 may be located on a main board, and provide auxiliary power to the SSD 4200.

The buffer memory 4240 may operate as a buffer memory of the SSD 4200. For example, the buffer memory 4240 may temporarily store data received from the host 4100 or data received from the plurality of flash memories 4221 to 422n, or temporarily store meta data (e.g., a mapping table) of the flash memories 4221 to 422n. The buffer memory 4240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

In some embodiments of the disclosed technology, a data storage device can improve booting operations and operating methods of the data storage device.

While this patent document contains many specifics, these should not be construed as limitations on the scope of any disclosed technology or of what may be claimed, but rather as descriptions of features that may be specific to particular embodiments of particular disclosed technology. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The embodiments and implementations disclosed above are examples only and enhancements and variations to the disclosed embodiments and implementations and other embodiments and implementations can be made based on what is described and illustrated in this patent document.

What is claimed is:

1. A storage device comprising:
a memory device including one or more boot partitions configured to store boot data for executing an operating system; and
a memory controller coupled to the memory device and configured to perform, upon receiving power, a rebuild operation to restore a first part of system data including active boot partition information associated with an activated boot partition among the one or more boot partitions and provide the active boot partition information to a host and to restore a second part of system data after providing the active boot partition information,
wherein, upon receiving, by the memory controller, from the host, a boot partition read request based on the active boot partition information, the memory controller transmits, to the host, the boot data stored in a boot partition corresponding to the active boot partition information,
wherein the first part of system data includes system data for performing an internal operation of the memory device and the memory controller according to a read request, a write request, or an erase request from the host, and
wherein the second part of system data includes system data for performing a background operation of the memory device and the memory controller.

2. The storage device of claim 1, wherein the memory device stores the first part of system data and the second part of system data respectively in a first system block and a second system block.

3. The storage device of claim 1, wherein, before the memory controller transmits the active boot partition information to the host and receives the boot partition read request, the memory controller performs a rebuild operation for transmitting, to the host, the boot data stored in the boot partition corresponding to the active boot partition information.

4. The storage device of claim 3, wherein, before the memory controller receives the boot partition read request from the host, the memory controller controls the memory device to read the boot data stored in the boot partition corresponding to the active boot partition information.

5. The storage device of claim 1, wherein the boot partition includes an activated first boot partition and an inactivated second boot partition.

6. The storage device of claim 5, wherein the first boot partition and the second boot partition have storage spaces having the same size.

7. The storage device of claim 1, wherein the memory controller includes:
a boot partition controller configured to control the memory device to activate or deactivate the boot partition; and
a boot partition status register configured to store status information of the boot partition.

8. The storage device of claim 7, wherein the boot partition controller controls the memory device to store data in the boot partition or to read data stored in the boot partition under the control of the host.

9. The storage device of claim 7, wherein the boot partition controller generates the active boot partition information based on the status information stored in the boot partition status register.

10. The storage device of claim 7, wherein the boot partition status register stores information on whether the boot partition is activated; an identity of the boot partition; or whether the boot partition is locked.

11. A method of operating a storage device including one or more boot partitions configured to store boot data for executing an operating system, the method comprising:
performing, upon receiving power, a rebuild operation to restore a first part of system data including active boot partition information associated with an activated boot partition among the one or more boot partitions;
transmitting the active boot partition information to a host, upon restoration of the first part of system data;
restoring a second part of system data including system data for performing a background operation of the storage device, after the first part of system data is restored; and
transmitting, to the host, the boot data stored in a boot partition corresponding to the active boot partition information in response to receiving, from the host, a boot partition read request based on the active boot partition information,
wherein the first part of system data includes system data for performing an internal operation of the storage device according to a read request, a write request, or an erase request from the host.

12. The method of claim 11, further comprising reading the boot data stored in the boot partition corresponding to the active boot partition information, before the boot partition read request is received from the host.

13. The method of claim 11, wherein the performing of the rebuild operation of restoring the first part of system data further includes restoring status information of the boot partition.

14. The method of claim 13, wherein the performing of the rebuild operation of restoring the first part of system data further includes generating the active boot partition information, based on the status information.

15. The method of claim 13, wherein the status information includes at least one of: whether the boot partition is activated; an identity of the boot partition; or whether the boot partition is locked.

16. A system comprising:
a memory device including one or more boot partitions configured to store boot data for executing an operating system;
a memory controller coupled to the memory device and configured to perform, upon receiving power, a rebuild operation to restore a first part of system data including active boot partition information associated with an activated boot partition among the one or more boot partitions; and a host in communication with the memory controller and configured to check the first part of system data from the memory controller, and transmit, to the memory controller, a boot partition read request based on the active boot partition information, wherein, upon receiving the boot partition read request at the memory controller, the memory controller transmits, to the host, the boot data stored in a boot partition corresponding to the active boot partition information, and restores a second part of system data after transmitting the active boot partition information to the host, wherein the first part of system data includes system data for performing an internal operation of the memory device and the memory controller according to a read request, a write request, or an erase request from the host, and wherein the second part of system data includes system data for performing a background operation of the memory device and the memory controller.

17. The system of claim 16, wherein the memory device stores the first part of system data and the second part of system data respectively in a first system block and a second system block.

18. The system of claim 16, wherein, before the memory controller transmits the active boot partition information to the host and receives the boot partition read request, the memory controller performs a rebuild operation for transmitting, to the host, the boot data stored in the boot partition corresponding to the active boot partition information.

19. The system of claim 16, wherein the boot partition includes an activated first boot partition and an inactivated second boot partition.

20. The system of claim 16, wherein the memory controller includes:
- a boot partition controller configured to control the memory device to activate or deactivate the boot partition; and
- a boot partition status register configured to store status information of the boot partition.

* * * * *